US011102289B2

(12) United States Patent
Dai (10) Patent No.: US 11,102,289 B2
(45) Date of Patent: Aug. 24, 2021

(54) METHOD FOR MANAGING RESOURCE STATE INFORMATION AND SYSTEM FOR DOWNLOADING RESOURCE (71) Applicant: Wangsu Science & Technology Co., Ltd., Shanghai (CN)

(72) Inventor: Xinying Dai, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/862,373

(22) Filed: Apr. 29, 2020

(65) Prior Publication Data

US 2021/0211493 A1     Jul. 8, 2021

Related U.S. Application Data (63) Continuation of application No. PCT/CN2020/074960, filed on Feb. 12, 2020.

(30) Foreign Application Priority Data

Jan. 3, 2020    (CN) .......................... 202010006155.1

(51) Int. Cl.
*H04L 29/08* (2006.01)
(52) U.S. Cl.
CPC ...... *H04L 67/1053* (2013.01); *H04L 67/1065* (2013.01); *H04L 67/1074* (2013.01); *H04L 67/1091* (2013.01); *H04L 67/1093* (2013.01)
(58) Field of Classification Search
CPC ............. H04L 67/1053; H04L 67/1093; H04L 67/1065; H04L 67/1091; H04L 67/1074; H04L 67/104; H04L 67/06
See application file for complete search history.

(56) References Cited

U.S. PATENT DOCUMENTS

| 2009/0012965 A1* | 1/2009 | Franken ................ G06Q 10/10 |
| 2009/0177772 A1* | 7/2009 | Guan .................. H04L 67/1002 709/224 |
| 2011/0238828 A1* | 9/2011 | Grigsby .............. H04L 67/1085 709/224 |

(Continued)

FOREIGN PATENT DOCUMENTS

| CN | 1852108 A | 10/2006 |
| CN | 1925444 A | 3/2007 |

(Continued)

OTHER PUBLICATIONS

Wikipedia, "Integer", Dec. 28, 2019, Wikipedia, 8 pages. (Year: 2019).*

(Continued)

*Primary Examiner* — Arvin Eskandarnia
*Assistant Examiner* — Chhian (Amy) Ling
(74) *Attorney, Agent, or Firm* — USCH Law, PC (57) ABSTRACT

The present disclosure provides a method for managing resource state information and a system for downloading a resource, which belongs to network communication technologies. According to the method, a target super node receives a file identification of at least one target resource file sent by a Tracker server (204); the target super node configures a download service of each of the at least one target resource file according to the file identification and a local resource storage state (205); and the target super node feeds back service configuration information of each of the at least one target resource file to the Tracker server (206).

17 Claims, 4 Drawing Sheets

(56) References Cited

U.S. PATENT DOCUMENTS

| | | |
|---|---|---|
| 2012/0136935 A1 | 5/2012 | Tcha et al. |
| 2012/0291041 A1* | 11/2012 | Cipar .................. G06F 9/5011 718/104 |
| 2013/0212226 A1* | 8/2013 | Gordon ................ H04L 65/60 709/219 |
| 2015/0229712 A1* | 8/2015 | Zhang ................ H04L 65/4069 709/204 |
| 2015/0271232 A1* | 9/2015 | Luby ...................... H04L 67/02 709/231 |
| 2016/0204916 A1* | 7/2016 | Dao ....................... H04L 45/02 709/226 |
| 2016/0353249 A1 | 12/2016 | Khatam et al. |
| 2017/0123982 A1* | 5/2017 | Haven ................ H04L 67/2842 |
| 2017/0339220 A1* | 11/2017 | Huang .................. H04L 67/104 |
| 2019/0068701 A1* | 2/2019 | Han .................... H04L 67/1074 |
| 2020/0366734 A1* | 11/2020 | Graham ............. H04L 67/1089 |

FOREIGN PATENT DOCUMENTS

| | | |
|---|---|---|
| CN | 101188625 A | 5/2008 |
| CN | 101764831 A | 6/2010 |
| CN | 101902346 A | 12/2010 |
| CN | 102833293 A | 12/2012 |
| CN | 103269351 A | 8/2013 |
| CN | 104967651 A | 10/2015 |
| CN | 109347968 A | 2/2019 |
| CN | 110247983 A | 9/2019 |

OTHER PUBLICATIONS

Wangsu Science & Technology Co., Ltd., International Search Report, PCT/CN2020/074960, dated Sep. 28, 2020, 4 pgs.
Wangsu Science & Technology Co., Ltd., First Office Action, CN202010006155.1, dated Dec. 28, 2020, 10 pgs.

* cited by examiner

METHOD FOR MANAGING RESOURCE STATE INFORMATION AND SYSTEM FOR DOWNLOADING RESOURCE

CROSS REFERENCE TO RELATED APPLICATIONS

This present disclosure is a continuation of PCT Application No. PCT/CN2020/074960, entitled "METHOD FOR MANAGING RESOURCE STATE INFORMATION AND SYSTEM FOR DOWNLOADING RESOURCE," filed Feb. 12, 2020, which claims priority to the Chinese Patent Application No. 202010006155.1, entitled "METHOD FOR MANAGING RESOURCE STATE INFORMATION AND SYSTEM FOR DOWNLOADING RESOURCE," filed Jan. 3, 2020, each of which is incorporated by reference herein in its entirety.

TECHNICAL FIELD

The present disclosure relates to network communication technologies and in particular to a method for managing resource state information and a system for downloading a resource.

BACKGROUND

P2P (peer-to-peer) technology is a communication technology that performs data transmission based on a peer-to-peer network, which establishes a client-to-client direct communication mechanism. In the peer-to-peer network, each P2P node serves not only as a client, but also as a server for other P2P nodes. In order to reduce a load pressure of a CDN node and save a CDN traffic cost of the CDN, a scheme for transmitting data blocks of a resource file based on the peer-to-peer network has been introduced on the basis of a CDN system.

A CDN service provider may deploy a large number of devices with good performance as super P2P nodes (hereinafter called as super nodes for short) in the peer-to-peer network in advance in a distributed manner, or select some clients with preferable network quality, CPU and memory performance as the super nodes. The super nodes may download and store all the data blocks of the resource file from the CDN server. In this way, when a certain resource file needs to be acquired, a client may request a node list from a Tracker server while downloading the data blocks from the CDN server, and the Tracker server may feed back node information of the super nodes that have stored corresponding resource files to the client. Thus, the client may establish connection with the super nodes, and acquire the data blocks of the resource files stored thereon from the super nodes.

The inventor of the present application finds that the existing technology at least has the following problems. The super nodes may report resource state information of all the resource files that are locally stored to the Tracker server when externally providing a resource download service, and the Tracker server may maintain the resource state information reported by each of the super nodes. However, a single super node usually stores a large number of resource files, so the Tracker server needs to maintain and manage a huge amount of resource state information, thereby resulting in an excessive load of the Tracker server and greatly affecting the service quality.

SUMMARY

In order to solve the problems of the existing technology, embodiments of the present disclosure provide a method for managing resource state information and a system for downloading a resource, and the technical solutions are as follows. In a first aspect, a method for managing resource state information includes:

receiving a file identification of at least one target resource file sent by a Tracker server;

configuring a download service of each of the at least one target resource file according to the file identification and a local resource storage state; and feeding back service configuration information of each of the at least one target resource file to the Tracker server.

In a second aspect, a method for managing resource state information includes:

determining an addable number of new resource files on a target super node;

selecting at least one target resource file from a plurality of resource files to be recommended according to the addable number and node lists corresponding to the plurality of resource files to be recommended;

sending a file identification of the target resource file to the target super node, so as to enable the target super node to configure a download service of each of the at least one target resource file; and receiving service configuration information of each of the at least one target resource file reported by the target super node, and updating the node list corresponding to each of the at least one target resource file.

In a third aspect, a system for downloading the resource includes a super node and a Tracker server, where the super node is configured to execute the method according to the first aspect and the Tracker server is configured to execute the method according to the second aspect.

In a fourth aspect, a network device is provided, and the network device includes a processor and a memory, where the memory stores at least one instruction, at least one program, a code set or an instruction set, and the at least one instruction, the at least one program, the code set or the instruction set is loaded and executed by the processor to perform the method according to the first aspect or the second aspect.

In a fifth aspect, a computer readable storage medium is provided, where the storage medium stores at least one instruction, at least one program, a code set or an instruction set, and the at least one instruction, the at least one program, the code set or the instruction set is loaded and executed by a processor to perform the method according to the first aspect or the second aspect.

The technical solutions provided by the embodiments of the present disclosure have the following beneficial effects. In the embodiments of the present disclosure, the Tracker server determines the addable number of the new resource files on the target super node, selects the at least one target resource file from the plurality of resource files to be recommended according to the addable number and the node lists corresponding to the plurality of resource files to be recommended, and sends the file identification of the target resource file to the target super node, so that the target super node configures the download service of each of the at least one target resource file, receives the service configuration information of each of the at least one target resource file reported by the target super node, and updates the node list corresponding to each of the at least one target resource file. In this way, the Tracker server is only responsible for pushing the resource files to super nodes, while a specific file management work is assigned to each of the super nodes deployed in a distributed manner. Meanwhile, the Tracker server does not need to recalculate service configuration states of all the resource files when performing fault recovery, thereby not only reducing a load pressure of the Tracker server, but also improving stability of the entire system for downloading the resource.

BRIEF DESCRIPTION OF THE DRAWINGS

In order to illustrate the technical solutions in the embodiments of the present disclosure more clearly, the accompanying drawings used in the description of the embodiments are briefly described below. It is apparent that the drawings described below are merely some embodiments of the present disclosure. For those of ordinary skills in the art, other drawings may also be obtained based on these drawings without any creative work.

DETAILED DESCRIPTION

To make the objectives, technical solutions, and advantages of the present disclosure more clear, the embodiments of the present disclosure are described in detail in combination with the accompanying drawings hereafter.

Figure 1:
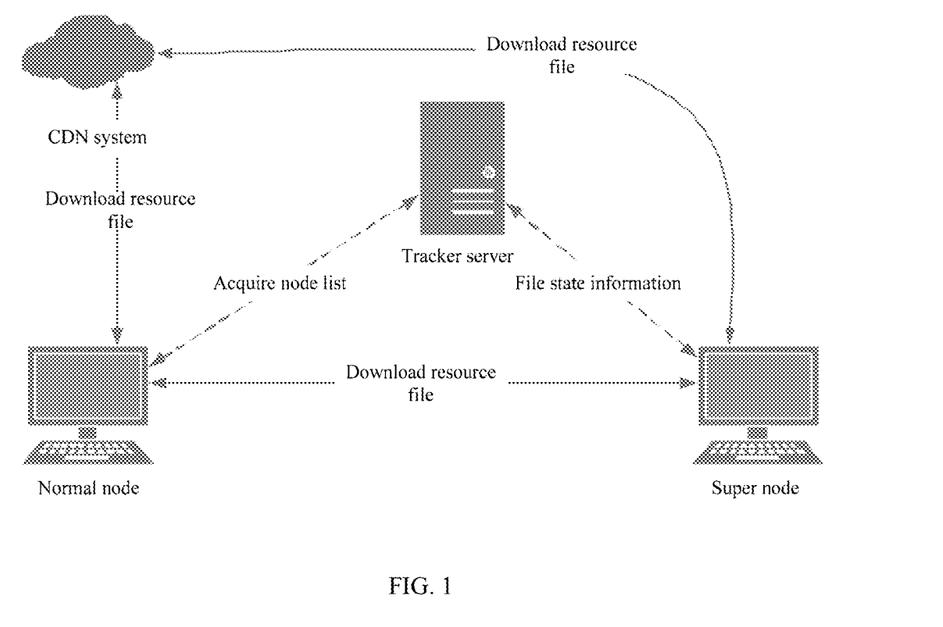
FIG. 1 is a schematic diagram of a network architecture of a peer-to-peer network provided in an embodiment of the present disclosure.

An embodiment of the present disclosure provides a method for managing resource state information, which may be applied in a peer-to-peer network and mainly implemented by both a Tracker server and super nodes in the peer-to-peer network. A specific architecture of the peer-to-peer network may be shown in FIG. 1, herein, the peer-to-peer network may include a large number of nodes, each of which may be used as a data downloader (i.e., a client) to download resource files from other nodes using a P2P technology, and may also be used as a data provider (i.e., a server) to provide the stored resource files to other nodes using the P2P technology. The nodes in the peer-to-peer network may include the super nodes and normal P2P nodes (hereinafter called as normal nodes for short). The Tracker server may be configured to collect and manage resource state information of the resource files on the nodes in the peer-to-peer network, so as to respond to a received node query request based on the resource state information. The above functions of the Tracker server may also be implemented in the form of a Tracker service cluster, the Tracker service cluster may consist of a plurality of Tracker servers deployed in a distributed manner, and different Tracker servers may be configured to serve the P2P nodes in different regions. In this embodiment, the super nodes may be mainly used to relieve a resource download pressure of a CDN server, that is, a CDN service provider may deploy some of the resource files on the super nodes. In this way, the client may download the resource files from the super nodes through the P2P technology without downloading from the CDN server when the client wants to acquire these resource files.

Figure 2:
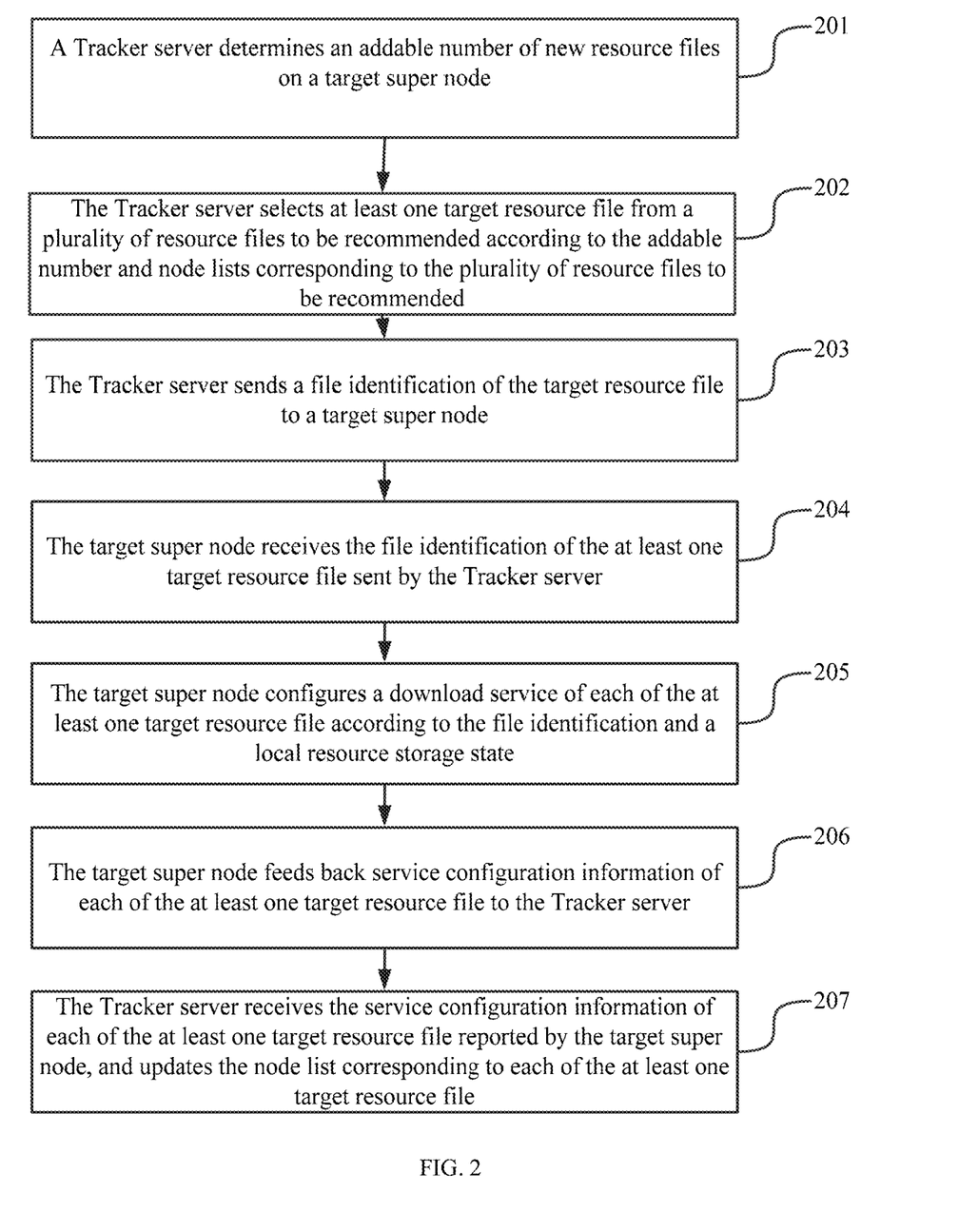
FIG. 2 is a flow chart of a method for managing resource state information provided in an embodiment of the present disclosure.

A processing flow shown in FIG. 2 is described in detail in combination with a specific embodiment, the contents of which may be as follows. In step 201, a Tracker server determines an addable number of new resource files on a target super node.

During implementation, when externally providing a download service of the resource file, a super node may continuously update the download service of the resource file provided thereof based on attribute information of the resource file, user requirement, distribution planning of the resource file by technicians and other factors, that is, the super node may regularly delete old resource files stored thereon and continuously download the new resource files from the CDN server. Of course, the super node may also download the new resource files from other super nodes or normal nodes in the peer-to-peer network based on the P2P technology, which is not limited in this embodiment. In the above process, the Tracker server may be configured to manage download processing of the new resource files on the super node, specifically, the Tracker server may recommend a plurality of resource files to the super node when the super node needs to add the new resource files, so that the super node may select the resource files it needs to add from the plurality of target resource files. Taking the target super node as an example, the Tracker server may determine the addable number of the new resource files on the target super node before recommending the new resource files to the target super node.

In one embodiment, there are many optional triggering manners for the Tracker server to recommend the resource files to the super node, and two feasible manners are given as follows. Manner 1:

in step 1, the target super node periodically determines the addable number of the new resource files according to a real-time bandwidth load state;

in step 2, the target super node sends a resource download request carrying the addable number to the Tracker server;

in step 3, the Tracker server receives the resource download request sent by the target super node, and acquires the addable number of the new resource files carried in the resource download request.

During implementation, the target super node may actively request the Tracker server to recommend the new resource files based on its own service state. Specifically, the target super node may periodically check a current network connection number to determine whether the network connection number reaches a preset connection upper limit. The target super node may determine an idle connection number at current if the current network connection number does not reach the preset connection upper limit. Meanwhile, a download performance occupation standard of the resource file may be pre-stored in each of the super nodes with, and the download performance occupation standard may reflect equipment performances (such as 3 network connections, 2G memory space and 10% CPU processing speed that are needed to download a certain resource file) required to be occupied by the super node when downloading the resource files from the CDN server (or other P2P nodes). However, compared with other equipment performances, the network connection number of the super node at the same time is relatively small, and the network connection number is often considered as a major bottleneck in the resource downloading process. Therefore, whether the idle connection number is sufficient needs to be preferentially considered when the super node actively requests the new resource files. It may be understood that the technicians may set different download performance occupancy standards for the resource files with different attribute information based on the attribute information such as sizes, categories, and owners of the resource files. However, since the storage space is an equipment performance index that is gradually accumulated and may not automatically decrease, the super node may also face a problem of insufficient remaining storage space when needing to add the new resource files after externally providing the download service of the resource file for a long time. Therefore, the super node may determine the addable number of the new resource files according to the idle connection number at current and the remaining storage space and based on the pre-stored download performance occupation standard of the resource file. Of course, when determining the addable number, the addable number of the new resource files may also be determined based on the above principles while referring to a plurality of equipment performances. Thus, the target super node may send the resource download request to the Tracker server, so that the Tracker server may directly acquire the addable number of the new resource files on the target super node from the resource download request.

Manner 2: in step 1, the target super node regularly reports a local real-time bandwidth load state and the remaining storage space to the Tracker server;

in step 2, the Tracker server determines the addable number of the new resource files on the target super node according to the real-time bandwidth load state and the remaining storage space regularly reported by the target super node.

During implementation, the target super node may regularly report the local real-time bandwidth load state and the remaining storage space to the Tracker server while externally providing the download service of the resource file. Accordingly, the Tracker server may record the real-time bandwidth load state and the remaining storage space reported by the target super node. On the one hand, the Tracker server may use the real-time bandwidth load state and the remaining storage space to select the super node when feeding back a node list to the normal node, so as to realize load balance between the super nodes. On the other hand, the addable number of the new resource files on the target super node may be determined according to the real-time bandwidth load state and the remaining storage space. Similarly to the manner 1, the download performance occupation standard of the resource file may also be pre-stored on the Tracker server, and the addable number of the above new resource files may be determined according to the download performance occupation standard. Similarly, the super node may also regularly report other equipment performance information to the Tracker server according to different equipment performances required by the download performance occupancy standard, so that the Tracker server may actively determine the addable number of the new resource files.

In step 202, the Tracker server selects at least one target resource file from a plurality of resource files to be recommended according to the addable number and the node lists corresponding to the plurality of resource files to be recommended.

During implementation, the Tracker server may first acquire the node lists corresponding to the plurality of resource files to be recommended in a pool of resources to be recommended after determining the addable number of the new resource files on the target super node, and the node lists may record node identifications of all the super nodes that have provided corresponding resource files at current. Then, the Tracker server may select at least one target resource file from the plurality of resource files to be recommended according to the addable number and the node lists corresponding to the plurality of resource files to be recommended. Herein, since some resource files from all the new resource files recommended by the Tracker server may have been stored on the target super node, the selected number of the target resource files may be equal to or slightly greater than the above addable number in order to make full use of the equipment performances of the target super node, such as bandwidth resources, storage space and the like.

In one embodiment, specifically, the above process of selecting the target resource file may be that the node lists corresponding to the plurality of resource files to be recommended may be traversed sequentially in descending order of a popularity value of the resource file; and the resource file to be recommended is selected as the target resource file when the node list of the resource file to be recommended does not contain the target super node, until the number of the target resource files is no less than the addable number and a difference between the number of the target resource files and the addable number is greater than a preset threshold.

During implementation, the Tracker server may sequentially select the plurality of resource files to be recommended from the pool of resources to be recommended in descending order of popularity values of the resource files, and acquire the node lists corresponding to the plurality of resource files to be recommended. Herein, the popularity value of the resource file may be reflected by the number of accesses to the resource file within a preset time. In this process, the Tracker server searches for the target super node in the node list of the resource file to be recommended. If the node list does not contain the target super node, the Tracker server may select the corresponding resource file to be recommended as the target resource file. However, if the node list contains the target super node, it means that the target super node has already provided the download service of the corresponding resource file, and it is not necessary to recommend the resource file to the target super node again, so the resource file may be skipped, and the node list of a next resource file to be recommended may be acquired. On the basis of the above process, the Tracker server may continuously select the resource files to be recommended one by one as the target resource files, until the number of the target resource files is no less than the addable number and the difference between the number of the target resource files and the addable number is greater than the preset threshold. Herein, a specific number of the target resource files may be determined manually with reference to the description in step 202.

In one embodiment, the Tracker server may simultaneously refer to the number of requests and the number of service nodes of the resource files to determine the resource files that needs to be recommended, and the corresponding processing may be as follows: calculating a recommendation coefficient corresponding to each of the resource files according to the number of the requests and the number of the service nodes that correspond to each of the resource files within a preset duration; and determining the resource file with the recommendation coefficient greater than the preset threshold as the resource file to be recommended.

During implementation, the Tracker server may record the number of the requests corresponding to each of the resource files and calculate the recommendation coefficient corresponding to each of the resource files with reference to the number of the service nodes of each of the resource files at the same time. Assuming that the number of the requests is N and the number of the service nodes is M, a calculation method of the recommendation coefficient C may be as follows:

$$C = \begin{cases} 0, & M = 0; \\ N/5M, & N \le T_1 \text{ and } M \ge 0; \\ N/2M, & T_1 < N \le T_2 \text{ and } M \ge 0; \\ N/M, & N > T_2 \text{ and } M \ge 0; \end{cases}$$

where $T_1$ and $T_2$ are preset number thresholds. The coefficients in the above formulas are used as illustration only and are not limited in this embodiment. Hereafter, the Tracker server may compare the calculated recommendation coefficient with the preset threshold, thereby determining the resource file with the recommendation coefficient greater than the preset threshold as the resource file to be recommended. In this way, the number of the requests for the resource file and the number of the super nodes already configured with the resource file are both considered when determining the resource file to be recommended, so that the recommendation coefficient may more accurately reflect actual recommendation requirement of each of the resource files. However, it may be seen from the calculation formula of the recommendation coefficient that, when the number of the requests of the resource file reaches a specific value, a popular resource file may be effectively avoided from being frequently recommended to the super node by adjusting the calculation method of the recommendation coefficient, thereby preventing the resource file from being repeatedly configured and effectively improving a resource utilization rate of the super node.

In step 203, the Tracker server sends a file identification of the target resource file to the target super node.

In step 204, the target super node receives the file identification of at least one target resource file sent by the Tracker server.

In step 205, the target super node configures a download service of each of the at least one target resource file according to the file identification and a local resource storage state.

During implementation, after receiving the file identification of the at least one target resource file sent by the Tracker server, the target super node may process the file identification one by one in combination with the local resource storage state to complete the configuration processing of the download service of each of the at least one target resource file. Specifically, for a target file identification, the target super node may first judge whether the target file identification exists in a local idle resource list at current. If yes, it means that the target super node has already stored the resource file corresponding to the target file identification, and then the download service of the resource file may be directly activated and the target file identification may be moved out of the idle resource list. If not, the target super node may download the resource file corresponding to the target file identification, and activate the download service of the resource file after the resource file has been downloaded.

In one embodiment, the super node may determine whether to close the download service of the corresponding resource file according to the number of accesses, and the corresponding processing may be as follows: periodically counting the number of accesses to the resource file locally stored outside the idle resource list within a current period; and adding the file identification of the resource file to the idle resource list if the number of accesses is less than the preset threshold, and sending a service stop notification of the resource file to the Tracker server.

During implementation, the target super node may periodically count the number of accesses to the resource file of which the download service is activated (i.e., the resource file locally stored outside the idle resource list) within the current period. If the number of accesses to a certain resource file is less than the preset threshold, the download service of the resource file may be closed, that is, the file identification of the resource file may be added to the idle resource list. Meanwhile, the service stop notification of the resource file may be sent to the Tracker server, so that the Tracker server deletes the node identification of the target super node from the node list of the resource file after receiving the service stop notification.

In one embodiment, based on the mechanism of the above idle resource list, some resources may be deleted according to the idle resource list if the remaining storage space is found to be insufficient when downloading the resource file, and the downloading process of the corresponding resource file may be as follows: calculating the popularity value corresponding to each of the file identifications in the idle resource list if the remaining storage space is smaller than a file size of the resource file corresponding to the target file identification; sequentially deleting the resource files locally stored and corresponding to the file identifications in the idle resource list in ascending order of the popularity value; and downloading the resource file corresponding to the target file identification when the remaining storage space is no less than the file size of the resource file corresponding to the target file identification.

During implementation, the target super node may continuously detect the current remaining storage space when downloading the resource file corresponding to the target file identification. If the remaining storage space is smaller than the file size of the resource file corresponding to the target file identification, the local idle resource list may be extracted, and the popularity value corresponding to each of the file identifications in the idle resource list may be calculated. Hereafter, the target super node may sequentially delete the resource files corresponding to the file identifications in the idle resource list from the local storage space in ascending order of the popularity value, and move the file identifications out from the idle resource list, thereby preferentially deleting the resource files with lower popularity value. Therefore, when detecting that the remaining storage space is no less than the file size of the resource file corresponding to the target file identification, the target super node may stop the deleting processing and download the resource file corresponding to the target file identification. Of course, the target super node may also download the resource files while deleting the resource files, so as to improve a download rate of the resource files.

In one embodiment, the super node may stop the download service of the resource file when the resource file configured with the download service is updated, and the corresponding processing may be as follows: regularly detecting whether the resource file locally stored has an update requirement; and if yes, deleting the resource file locally stored, and sending the service stop notification of the resource file to the Tracker server.

During implementation, the target super node may regularly detect whether the resource file locally stored has the update requirement, and a file version query mechanism in the existing technologies may be used as the detection method here, which is not described in detail in this embodiment. When a certain resource file is found to have the update requirement (i.e., a new version appears), the target super node may stop the download service of the resource file, that is, the target super node deletes the resource file locally stored and sends the service stop notification of the resource file to the Tracker server. In this way, the super node deletes the resource files with the expired version in time, which may save a lot of storage resources on the one hand, and may also ensure that the expired resource files are not downloaded by mistake on the other hand, thereby improving the download service quality of the resource file. In this embodiment, differing from the above updating-deleting mechanism, if it is detected that the resource file has a patch file with a much smaller volume of data than the resource file, the super node may actively download the patch file instead of deleting the resource file. In this way, the resource file may be avoided from being repeatedly recommended by the Tracker server and repeatedly downloaded by the super node.

In step 206, the target super node feeds back service configuration information of each of the at least one target resource file to the Tracker server.

During implementation, the target super node may feed back the service configuration information of each target resource file to the Tracker server after the download service of each of the at least one target resource file has been configured. Herein, the service configuration information may at least include a download service configuration situation (success or failure) of each of the at least one target resource file.

In step 207, the Tracker server receives the service configuration information of each of the at least one target resource file reported by the target super node, and updates the node list corresponding to each of the at least one target resource file.

During implementation, the Tracker server may update the node list corresponding to each of the at least one target resource file according to the service configuration information after receiving the service configuration information reported by the target super node. That is, the Tracker server adds the node identification of the target super node in the node list of the target resource file if the target super node has successfully configured the download service of the target resource file; otherwise, no processing is carried out.

Figure 3:
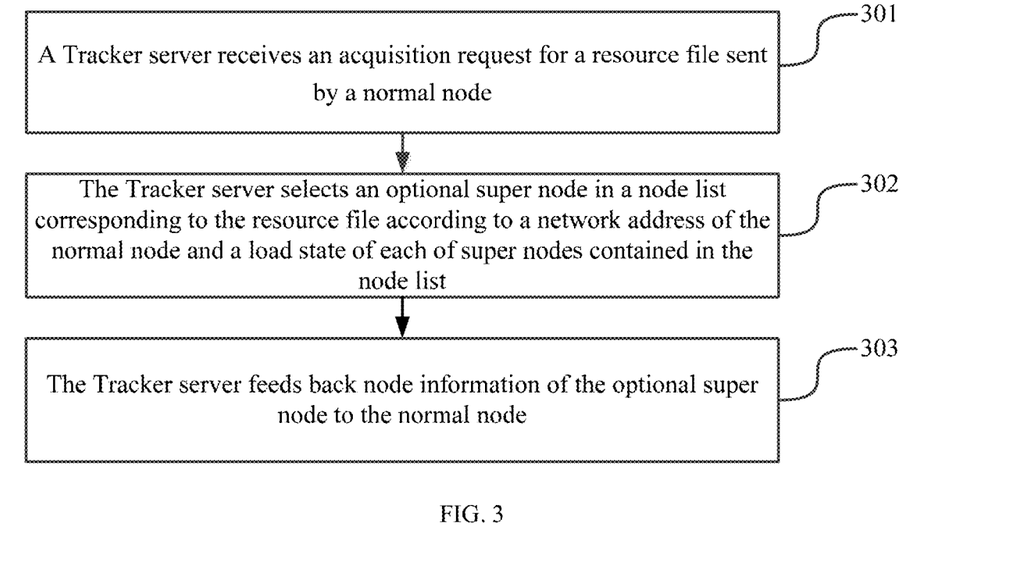
FIG. 3 is a flow chart of downloading a resource file provided in an embodiment of the present disclosure.

In one embodiment, the embodiment further discloses a flow chart of downloading the resource files based on the above steps 201 to 207, as shown in FIG. 3, which may be specifically as follows. In step 301, the Tracker server receives an acquisition request for a resource file sent by a normal node.

During implementation, when a user wants to acquire a certain resource file through a client (i.e., the normal node), the user may open a resource download program installed on the client and input identification information of the resource file into the resource download program, so that the resource download program may execute a download task of the resource file. However, some resources have been pre-deployed at a super node based on settings of a CDN service provider. Therefore, the resource download program may first judge a download manner of the resource file, that is, whether the resource file is downloaded through a peer-to-peer network or through a CDN server. And the resource download program may trigger the client to send the acquisition request for the resource file to the Tracker server if the resource file is downloaded through the peer-to-peer network.

In step 302, the Tracker server selects an optional super node in a node list corresponding to the resource file according to a network address of the normal node and a load state of each of the super nodes contained in the node list.

During implementation, the Tracker server may read the node list corresponding to the resource file after receiving the acquisition request for the resource file sent by the normal node, and then select a plurality of optional super nodes with lower load that are close to the normal node in the node list according to the network address of the normal node.

In step 303, the Tracker server feeds back node information of the optional super node to the normal node.

In the embodiments of the present disclosure, the Tracker server determines the addable number of the new resource files on the target super node, selects the at least one target resource file from the plurality of resource files to be recommended according to the addable number and the node list corresponding to the plurality of resource files to be recommended, and sends the file identification of the target resource file to the target super node, so that the target super node configures the download service of each of the at least one target resource file, receives the service configuration information of each of the at least one target resource file reported by the target super node, and updates the node list corresponding to each of the at least one target resource file. In this way, the Tracker server is only responsible for pushing the resource files to the super nodes, while the specific file management work is assigned to each of the super nodes deployed in a distributed manner. Meanwhile, the Tracker server does not need to recalculate service configuration states of all the resource files when performing fault recovery, thereby not only reducing a load pressure of the Tracker server, but also improving stability of the entire system for downloading the resource.

Based on the same technical concept, an embodiment of the present disclosure further provides a system for downloading a resource, and the system for downloading the resource includes a super node and a Tracker server. Herein, the super node is configured to execute the processing performed by the target super node in the above embodiment, and the Tracker server is configured to execute the processing performed by the Tracker server in the above embodiment.

Figure 4:
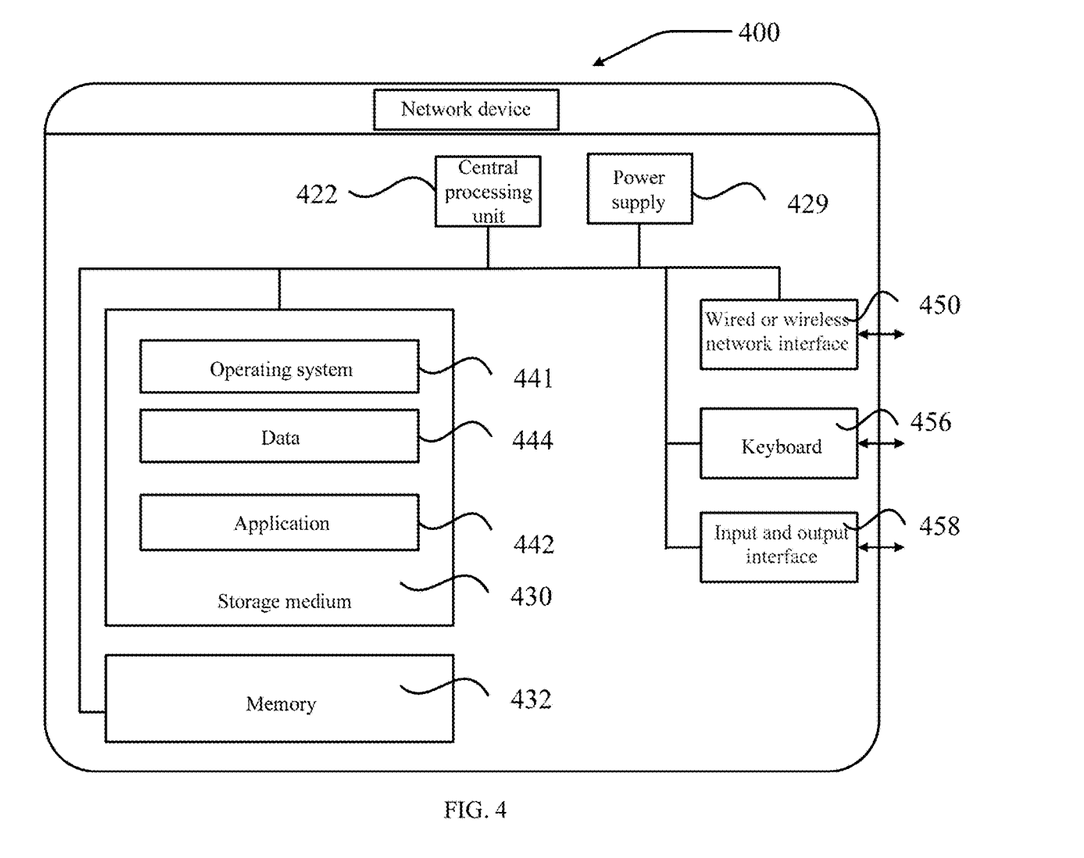
FIG. 4 is a schematic structural diagram of a network device provided in an embodiment of the present disclosure.

FIG. 4 is a schematic structural diagram of a network device provided in an embodiment of the present disclosure. The network device 400 may have relatively large differences due to different configurations or performances, and may include one or more central processing units 422 (e.g., one or more processors) and a memory 432, one or more storage medium 430 (e.g., one or more mass storage devices) storing an application 442 or data 444. Herein, the memory 432 and the storage medium 430 may be in the form of temporary storage or persistent storage. The program stored in the storage medium 430 may include one or more modules (not shown in the figure), and each module may include a series of instruction operations to the network device 400. In this embodiment, the central processing unit 422 may be configured to communicate with the storage medium 430 and execute the series of instruction operations in the storage medium 430 on the network device 400.

The network device 400 may also include one or more power supplies 429, one or more wired or wireless network interfaces 450, one or more input and output interfaces 458, one or more keyboards 456, and/or one or more operating systems 441 such as Windows Server, Mac OS X, Unix, Linux, FreeBSD, and the like.

The network device 400 may include a memory and one or more programs, where the one or more programs are stored in the memory and configured to be executed by one or more processors, and the one or more programs contains the instruction for managing the resource state information.

Those of ordinary skills in the art may understand that all or some steps in the above embodiments may be implemented by hardware or by instructing relevant hardware through a program. The program may be stored in a computer-readable storage medium and the storage medium mentioned above may be a read-only memory, a magnetic disk, an optical disk or the like.

Those described above are merely some embodiments of the present disclosure, which are not intended to limit the present disclosure. Any modification, equivalent replacement and improvement within the spirit and principle of the present disclosure shall be included in the protection scope of the present disclosure.

What is claimed is:

1. A method for managing resource state information, comprising:
    at a super node in a peer-to-peer network including a Tracker server;
    receiving at least one file identification of at least one target resource file sent by the Tracker server, wherein the at least one target resource file includes at least one resource file selected by the Tracker server from a plurality of resource files to be recommended to the super node;
    configuring a download service of each target resource file of the at least one target resource file according to the file identification of the each target resource file and a local resource storage state, including:
        for a target file identification of the at least one file identification, judging whether the target file identification exists in an idle resource list locally stored at current;
        moving the target file identification out of the idle resource list in response to determining that the target file identification exists in the idle resource list; and
        downloading a resource file corresponding to the target file identification in response to determining that the target file identification does not exist in the idle resource list; and
    feeding back download service configuration information of the each target resource file to the Tracker server.

2. The method according to claim 1, further comprising:
    determining an addable number of new resource files periodically according to a real-time bandwidth load state, wherein the addable number is a positive natural number; and
    sending a resource download request carrying the addable number to the Tracker server, so as to enable the Tracker server to feed back the at least one file identification of the at least one target resource file based on the addable number.

3. The method according to claim 2, wherein determining the addable number of the new resource files periodically according to the real-time bandwidth load state comprises:
    determining an idle connection number periodically based on a current network connection number and a preset connection upper limit; and
    determining the addable number of the new resource files according to the idle connection number and a remaining storage space and based on a pre-stored download performance occupation standard of the resource file.

4. The method according to claim 1, further comprising:
    regularly reporting a local real-time bandwidth load state and a remaining storage space to the Tracker server.

5. The method according to claim 1, further comprising:
    periodically counting the number of accesses to the resource file locally stored outside the idle resource list within a current period; and
    adding the file identification of the resource file to the idle resource list if the number of accesses is less than a preset threshold, and sending a service stop notification of the resource file to the Tracker server.

6. The method according to claim 5, wherein downloading the resource file corresponding to the target file identification comprises:
    calculating a popularity value corresponding to each of file identifications in the idle resource list if the remaining storage space is smaller than a file size of the resource file corresponding to the target file identification;
    sequentially deleting resource files that are locally stored and correspond to the file identifications in the idle resource list in ascending order of the popularity value; and
    downloading the resource file corresponding to the target file identification when the remaining storage space is no less than the file size of the resource file corresponding to the target file identification.

7. The method according to claim 1, further comprising:
    regularly detecting whether a resource file locally stored has an update requirement; and
    deleting the resource file locally stored if the resource file locally stored has the update requirement, and sending a service stop notification of the resource file to the Tracker server.

8. A system for downloading a resource, comprising a super node and a Tracker server, wherein the super node is configured to:
    receive at least one file identification of at least one target resource file sent by a Tracker server, wherein the at least one target resource file includes at least one resource file selected by the Tracker server from a plurality of resource files to be recommended to the super node;
    for a target file identification of the at least one file identification, judge whether the target file identification exists in an idle resource list locally stored at current;
    move the target file identification out of the idle resource list in response to determining that the target file identification exists in the idle resource list; and
    download a resource file corresponding to the target file identification in response to determining that the target file identification does not exist in the idle resource list; and
    feed back download service configuration information of the each target resource file to the Tracker server;
    and wherein the Tracker server is configured to:
    determine an addable number of new resource files on a target super node, wherein the addable number is a positive natural number;
    select at least one resource file from a plurality of resource files to be recommended to the target super node as at least one target resource file according to the addable number and node lists corresponding to the plurality of resource files to be recommended;

send at least one file identification of the at least one target resource file to the target super node, so as to enable the target super node to configure a download service of each target resource file of the at least one target resource file; and receive download service configuration information of the each target resource file reported by the target super node, and update the node list corresponding to the each target resource file.

9. The system according to claim 8, wherein the Tracker server is configured to determine the addable number of the new resource files on the target super node by:

receiving a resource download request sent by the target super node, and acquiring the addable number of the new resource files carried in the resource download request.

10. The system according to claim 8, wherein the Tracker server is configured to determine the addable number of the new resource files on the target super node by:

determining the addable number of the new resource files on the target super node according to a real-time bandwidth load state and a remaining storage space periodically reported by the target super node.

11. The system according to claim 8, wherein the Tracker server is configured to select the at least one resource file from the plurality of resource files to be recommended to the target super node as at least one target resource file according to the addable number and the node lists corresponding to the plurality of resource files to be recommended by:

sequentially traversing the node lists corresponding to the plurality of resource files to be recommended in descending order of a popularity value; and selecting the resource file to be recommended as the target resource file when the node list of the resource file to be recommended does not contain the target super node, until the number of the target resource files is no less than the addable number and a difference between the number of the target resource files and the addable number is greater than a preset threshold.

12. The system according to claim 11, wherein the Tracker server is further configured to:

calculate a recommendation coefficient corresponding to each of resource files according to the number of requests and the number of service nodes corresponding to each of the resource files within a preset duration; and determine the resource file with the recommendation coefficient greater than the preset threshold as the resource file to be recommended.

13. The system according to claim 8, wherein the Tracker server is further configured to:

receive an acquisition request for a resource file sent by a normal node;

select an optional super node in a node list corresponding to the resource file according to a network address of the normal node and a load state of each of super nodes contained in the node list; and feed back node information of the optional super node to the normal node.

14. The system according to claim 8, wherein the Tracker server is further configured to:

delete a node identification of the target super node from a node list of the target resource file after receiving a service stop notification of the target resource file sent by the target super node.

15. The system according to claim 8, wherein the super node is further configured to:

determine an addable number of new resource files periodically according to a real-time bandwidth load state; and send a resource download request carrying the addable number to the Tracker server, so as to enable the Tracker server to feed back the at least one file identification of the at least one target resource file based on the addable number.

16. The system according to claim 15, wherein the super node is further configured to:

determine an idle connection number periodically based on a current network connection number and a preset connection upper limit; and determine the addable number of the new resource files according to the idle connection number and a remaining storage space and based on a pre-stored download performance occupation standard of the resource file.

17. The system according to claim 8, wherein the super node is further configured to report a local real-time bandwidth load state and a remaining storage space to the Tracker server regularly.

* * * * *